（12）United States Patent
Reinsch et al.

(10) Patent No.: US 11,527,871 B2
(45) Date of Patent: Dec. 13, 2022

(54) SPARK PLUG CONNECTING ELEMENT AND SPARK PLUG

(71) Applicant: Robert Bosch GmbH, Stuttgart (DE)

(72) Inventors: Benedikt Reinsch, Riederich (DE); Carsten Kuenzel, Tamm (DE); Corinna Vonau, Stuttgart (DE); Hubertus Braun, Benningen (DE); Stefan Nufer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/427,267

(22) PCT Filed: Jan. 24, 2020

(86) PCT No.: PCT/EP2020/051818
§ 371 (c)(1),
(2) Date: Jul. 30, 2021

(87) PCT Pub. No.: WO2020/160941
PCT Pub. Date: Aug. 13, 2020

(65) Prior Publication Data
US 2022/0102945 A1    Mar. 31, 2022

(30) Foreign Application Priority Data

Feb. 7, 2019  (DE) ............... 10 2019 201 574.3
Oct. 23, 2019 (DE) ............... 10 2019 216 340.8

(51) Int. Cl.
*H01T 13/39* (2006.01)
*H01T 13/04* (2006.01)
*H01T 21/02* (2006.01)

(52) U.S. Cl.
CPC ............ *H01T 13/39* (2013.01); *H01T 13/04* (2013.01); *H01T 21/02* (2013.01)

(58) Field of Classification Search
CPC .......... H01T 13/39; H01T 13/04; H01T 21/02
See application file for complete search history.

(56) References Cited

U.S. PATENT DOCUMENTS 3,909,459 A * 9/1975 Friese .................... H01T 13/39
501/99
4,427,915 A * 1/1984 Nishio ................... H01T 13/39
313/131 A
(Continued)

FOREIGN PATENT DOCUMENTS

| EP | 1592101 A2 | 11/2005 |
|----|------------|---------|
| EP | 3163692 A1 | 5/2017 |
| WO | 0174731 A1 | 10/2001 |

OTHER PUBLICATIONS

International Search Report for PCT/EP2020/051818 dated Apr. 14, 2020.

*Primary Examiner* — Kevin Quarterman
(74) *Attorney, Agent, or Firm* — Norton Rose Fulbright US LLP; Gerard Messina

(57) ABSTRACT

A spark plug connecting element. The spark plug connecting element includes a first contact element and a second contact element. A resistor element is situated between the first contact element and the second contact element. The first contact element and the second contact element have a specific conductivity of $10^2$ S/m to $10^8$ S/m and the resistor element has a specific conductivity of $10^{-3}$ S/m to $10^1$ S/m.

22 Claims, 2 Drawing Sheets

(56) References Cited

U.S. PATENT DOCUMENTS

| | | | | |
|---|---|---|---|---|
| 6,274,971 B1* | 8/2001 | Sugimoto | ............... | C03C 8/04 |
| | | | | 313/143 |
| 2003/0051341 A1* | 3/2003 | Nishikawa | ............. | H01T 21/02 |
| | | | | 427/58 |
| 2003/0082982 A1* | 5/2003 | Nishikawa | ............. | H01T 21/02 |
| | | | | 445/7 |
| 2018/0034247 A1* | 2/2018 | Ma | ......................... | H01T 13/41 |

* cited by examiner

SPARK PLUG CONNECTING ELEMENT AND SPARK PLUG

BACKGROUND INFORMATION

The present invention relates to a spark plug connecting element and a spark plug having improved resistance to oxidation.

Spark plugs, which are situated in a combustion chamber of an internal combustion engine, have a specific electrical resistance of 1 kΩ to 14 kΩ, in order to improve the electromagnetic compatibility of the spark plugs. Typically, a spark plug connecting element is utilized here, which connects an electrical terminal of the spark plug to the base of a center electrode and includes glass, crystalline oxides, and at least one inorganic, nonoxidic, electrically conductive material, usually carbon black. The spark plug connecting element may also be made up of multiple individual components, depending on the electrical resistance or electrical conductivity to be set. During the manufacturing process of the spark plug, high temperatures are applied, which results in the oxidation of the nonoxidic, electrically conductive materials and, thereby, to the degradation of the electrical resistance value of the spark plug connecting element. Such an oxidation may also take place during the use of the spark plug as intended.

SUMMARY

A spark plug connecting element according to an example embodiment of the present invention has a very high oxidation resistance and, thereby, by a very long durability in the presence of a permanently stable, high electrical resistance. In accordance with an example embodiment of the present invention, the spark plug connecting element includes a first contact element, a second contact element, and a resistor element, the resistor element being situated between the first contact element and the second contact element. Moreover, the first contact element is connected, in a spark plug, to the electrical terminal of the spark plug. The second contact element is connected, in the spark plug, to the base of the center electrode. The resistor element is utilized for imparting a specific total resistance to the spark plug, while the first contact element and also the second contact element improve the electrical conductivity between the adjacent components.

According to an example embodiment of the present invention, a high oxidation resistance and a good resistance value of the spark plug connecting element are achieved, in that the first contact element and the second contact element have a specific conductivity of $10^2$ S/m to $10^8$ S/m and the resistor element has a specific conductivity of $10^{-3}$ S/m to $10^1$ S/m. The specific conductivity may be ascertained according to DIN 1324 (May 1988).

Due to the spark plug connecting element according to the present invention, a very good durability thereof is achieved and a stably settable resistance value is obtained.

Preferred refinements of the present invention are disclosed herein.

In order to be able to set the resistance value of the resistor element and, thereby, also the resistance value of a spark plug in a particularly simple and stable manner, the first contact element and/or the second contact element and/or the resistor element contain(s) at least one first oxide. Particularly advantageously, due to the low oxidizability, the first contact element as well as the second contact element and also the resistor element contain at least one first oxide.

The first oxide is selected from the group made up of oxides of the following general formula (1):

$$M_{1-x}D_xO_2 \qquad \text{formula (1)}$$

M being selected from Ti, Zr, Sn and combinations thereof, D being selected from V, Nb, Ta, P, As, Sb, Bi and combinations thereof, and 0<x<0.5.

Alternatively or additionally, the first oxide is at least an oxide of the following general formula (2):

$$Zn_{1-y}Q_yO \qquad \text{formula (2),}$$

Q being selected from Al, Ga, In, B, Ti, Zr, Hf, Si, Ge, Sn and combinations thereof, and 0<y<0.5.

The first oxides of the general formula (1) and the general formula (2) are doped, electrically conductive oxides.

As a further alternative or additional possibility, the first oxide is at least an oxide selected from the group made up of: $ZrO_{2-r}$, $TiO_{2-r}$, $SnO_{2-r}$, $ZnO_{1-r}$, $HfO_{2-r}$, $V_2O_{5-r}$, $Nb_2O_{5-r}$, and $Ta_2O_{5-r}$, where 0.5>r≥0. Preferably, r=0.0001 to 0.1. These oxides are reduced, electrically conductive materials.

The aforementioned first oxides utilized according to an example embodiment of the present invention are crystalline oxides and are distinguished by good electrical conductivity. They may be utilized individually or arbitrarily combined with one another. They are essentially non-oxidizable when the spark plug connecting element is used as intended, so that the spark plug connecting element has a permanently good resistance to oxidation and, thereby, a very good durability in combination with a stably settable resistance value.

Further advantageously, in the sense of a reduced oxidizability, the first contact element and/or the second contact element and/or the resistor element 8 are/is free of metals and carbonaceous compounds and, in particular, the first contact element and/or the second contact element and/or the resistor element are/is free of inorganic, nonoxidic, electrically conductive materials, metals, and alloys. This means that no inorganic, nonoxidic, electrically conductive materials, metals, and alloys have been added to the composition of the particular or appropriate element (or also elements) of the spark plug connecting element. A content of these compounds, except for technically unavoidable residues, is, therefore, 0 mass percent, based on the total mass of the particular element. If, for example, both contact elements or at least one contact element and the resistor element or also the first contact element, the second contact element, and the resistor element are free of inorganic, nonoxidic, electrically conductive materials, metals, and alloys, it applies, for each of these elements, that the content of inorganic, nonoxidic, electrically conductive materials, metals, and alloys, except for technically unavoidable residues, is 0 mass percent.

The inorganic, nonoxidic, electrically conductive materials to be avoided are, for example, carbon black, graphite, and carbide, and the carbides are to be understood to be silicon carbide, tungsten carbide, iron carbide, boron carbide, titanium carbide, zirconium carbide, hafnium carbide, vanadium carbide, niobium carbide, tantalum carbide, molybdenum carbide, and mixtures thereof. Metals to avoid are, for example, iron, tungsten, titanium, copper, silver, and mixtures thereof, as well as metal alloys.

In accordance with an example embodiment of the present invention, in order to improve the stability of the spark plug connecting element and, furthermore, to improve the resistance value thereof, the first contact element and/or the second contact element and/or the resistor element advantageously, furthermore, contain at least one second oxide, which is an inorganic, amorphous oxide. An inorganic, amorphous oxide is understood, according to the present invention, to be a glass, which is formed from one or multiple metal oxides. The glass is essentially unlimited and is selected with respect to the resistance value to be set and its temperature resistance.

Advantageously, in particular, a silicate glass is used as the second oxide, since silicate glasses are highly stable and simultaneously highly electrically insulating. They form a very good matrix for the first oxide. For the aforementioned reasons, the glass is preferably a borosilicate glass, such as, in particular, a lithium borosilicate glass, a lithium calcium borosilicate glass, or a sodium borosilicate glass.

A particularly advantageous composition of a glass (the quantities relate to the total mass of this composition) is:
$SiO_2$: 35 mass percent to 65 mass percent,
$B_2O_3$: 20 mass percent to 55 mass percent,
$LiO_2$: 0.5 mass percent to 10 mass percent,
$Na_2O$: 0 mass percent to 10 mass percent,
$K_2O$: maximally 2 mass percent,
CaO: 0 mass percent to 15 mass percent,
SrO: 0 mass percent to 15 mass percent,
BaO: 0 mass percent to 10 mass percent,
MgO: 0 mass percent to 15 mass percent,
$Al_2O_3$: 0 mass percent to 15 mass percent, and
PbO: 0 mass percent to 5 mass percent.

Further advantageously, the first contact element and/or the second contact element and/or the resistor element contain(s) at least one third oxide, which is a crystalline oxide, selected from $ZrO_2$, $TiO_2$, $Al_2O_3$, and mixtures thereof. Due to this third oxide, the electrical resistance of the spark plug connecting element may be improved.

According to one further advantageous specific embodiment of the present invention, the total content of the first oxide in the first contact element and/or in the second contact element and/or in the resistor element is maximally 100 mass percent, in particular 40 mass percent to 95 mass percent and, in particular, 60 mass percent to 85 mass percent, in each case with respect to the total mass of the particular element. If the first oxide in one of the elements of the spark plug connecting element is used in a content of 100 mass percent, the corresponding element is made up of the first oxide. This means, no other oxides or other materials are added. Due to this specific embodiment, a desired resistance value or a desired conductivity may be particularly easily set.

An adaptation of the content of the first oxide in the range from 40 mass percent to 95 mass percent and, in particular, from 60 mass percent to 85 mass percent makes it possible to add further components to the spark plug connecting element, in particular, to add at least one second oxide, which may improve the stability of the spark plug connecting element and stabilize the electrical resistance of the resistor element and the conductivity of the first contact element and/or of the second contact element.

For the aforementioned reasons, it is further advantageous that the total content of the second oxide in the first contact element and/or in the second contact element and/or in the resistor element is more than 0 mass percent to 75 mass percent, in particular, more than 0 mass percent to 45 mass percent, in particular 20 mass percent to 40 mass percent and, in particular, 28 mass percent to 38 mass percent, in each case with respect to the total mass of the particular element (first contact element, second contact element, resistor element).

In one further specific embodiment of the present invention, the spark plug connecting element contains a third oxide, in order to be able to even more easily adapt the resistance value of the resistor element or the conductivity of the first contact element and/or of the second contact element. The total content of the third oxide in the first contact element and/or in the second contact element and/or in the resistor element is, therefore, advantageously more than 0 mass percent to 20 mass percent, in particular 2 mass percent to 10 mass percent and, in particular, 3 mass percent to 5 mass percent, in each case with respect to the total mass of the particular element.

In one particularly preferred specific embodiment, the first contact element and/or the second contact element and/or the resistor element are/is made up of at least one first oxide and at least one additive. The total content of additive, with respect to the total mass of the particular element, is less than 5 mass percent, in particular, less than 0.5 mass percent, and may also be 0 mass percent. It is particularly preferred when the first contact element, the second contact element, and the resistor element are made up of at least one first oxide and at least one additive, the total content of additive in each of the elements being less than 5 mass percent and, in particular, less than 0.5 mass percent and also 0 mass percent.

In other words, the first contact element and/or the second contact element and/or the resistor element may be made up solely of the first oxide. Such an element may be very easily manufactured, since no specific method steps need to be applied in order to blend different materials. It may be helpful, however, to add additives, such as, for example, a binder, which, however, is commonly broken down due to the effect of temperature during the production of the spark plug connecting element and, thereby, is no longer detectable in the completed spark plug electrode.

Optionally, the first contact element and/or the second contact element and/or the resistor element, furthermore, may include at least one second oxide and, optionally, also at least one third oxide. Here, in particular, the total quantities described above for the second oxide and the third oxide, with respect to the total mass of the particular element, are usable.

Likewise, according to an example embodiment of the present invention, a spark plug is also provided, which includes at least one spark plug connecting element as described above. Due to the specific conductivities of the first contact element and of the second contact element as well as the specific conductivity (the specific resistance) of the resistor element of the spark plug connecting element, the spark plug is distinguished by a very high oxidation resistance, also when used as intended and, thereby, by a high chemical and, thereby, also mechanical stability.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
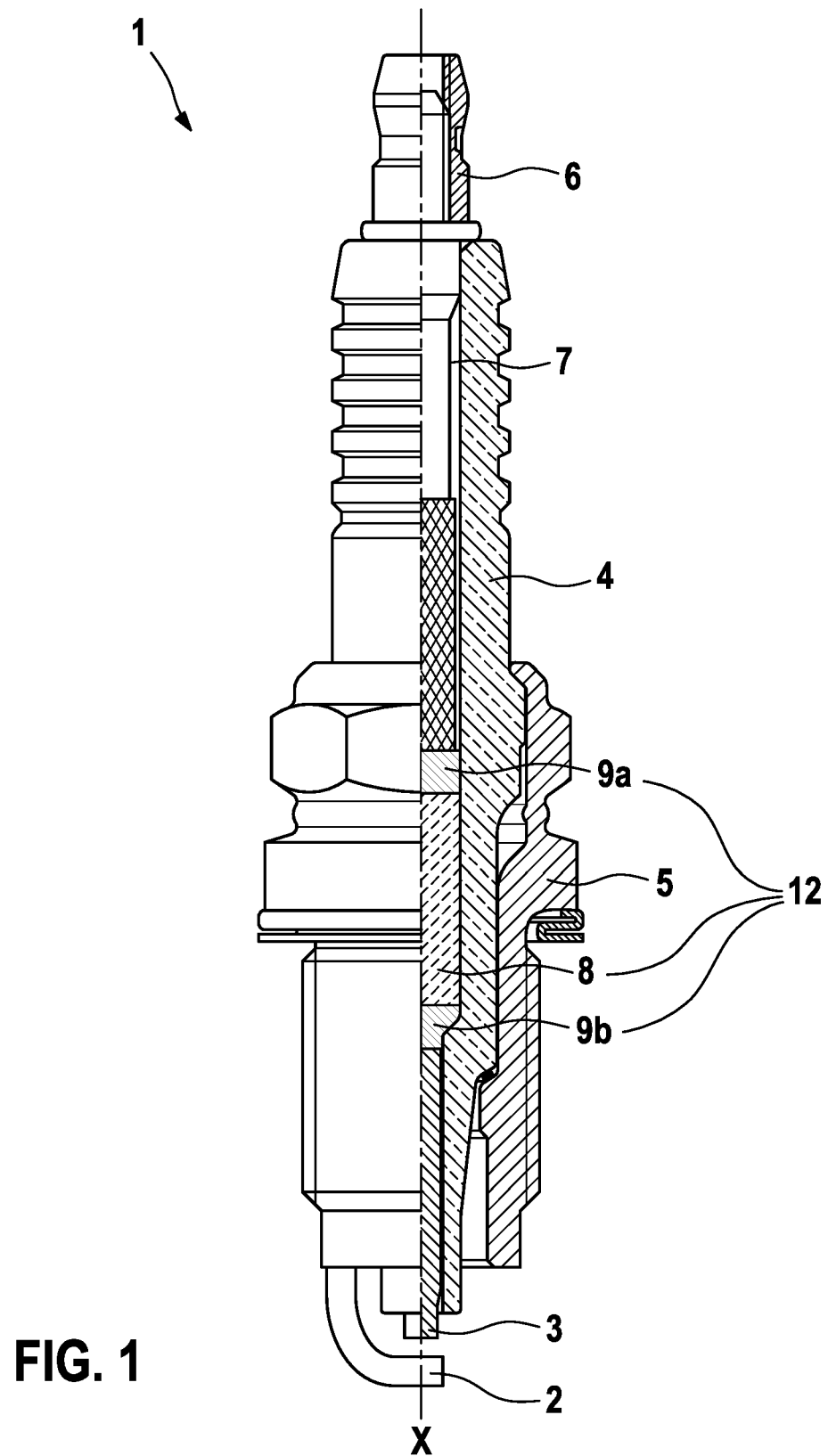
FIG. 1 shows a partially cut-away view of a spark plug according to a first specific example embodiment of the present invention.

In the figures, only the main features of the present invention are represented. All other features have been omitted for the sake of clarity. Moreover, identical components are provided with identical reference numerals.

As is shown in FIG. 1, spark plug 1 according to a first specific embodiment includes a ground electrode 2 and a center electrode 3. An insulator 4 is provided in such a way that center electrode 3 projects slightly from insulator 4 in a conventional way. Insulator 4 itself is partially surrounded by a housing 5. Reference numeral 6 designates an electrical terminal nut 6. Electrical terminal nut 6 provides an electrically conductive connection to center electrode 3 via a connecting bolt 7, a first contact element 9a, a resistor element 8, and a second contact element 9b. First contact element 9a, second contact element 9b, and resistor element 8 situated between first contact element 9a and second contact element 9b are indicated collectively as spark plug connecting element 12. First contact element 9a and second contact element 9b have a specific conductivity of $10^2$ S/m to $10^8$ S/m. As a result, the voltage transmitted from electrical terminal nut 6 via connecting bolt 7 onto first contact element 9a is transferred largely without resistance. The voltage conveyed from resistor element 8 via second contact element 9b to center electrode 3 is also conveyed largely without loss by second contact element 9b due to the very good conductive properties. In other words, first contact element 9a and second contact element 9b have a high electrical conductivity and, thereby, a low electrical resistance.

Figure 2:
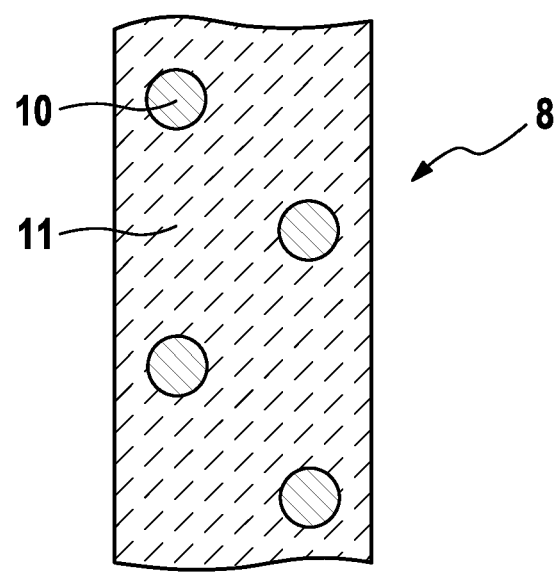
FIG. 2 shows a schematic sectional view of a resistor element according to a second specific example embodiment of the present invention.

Resistor element 8, which is represented in detail in FIG. 2, has a very good oxidation resistance and, associated therewith, a permanently stable resistance value. As a result, not only is the chemical and, thereby, also the mechanical stability of resistor element 8 improved, but also the corresponding properties of spark plug 1. Spark plug 1 therefore also has a long durability when used as intended.

FIG. 2 is a schematic sectional view of resistor element 8 from FIG. 1. Resistor element 8 has a specific conductivity of $10^{-3}$ S/m to $10^1$ S/m and includes at least one first oxide 11.

First oxide 11 may be an oxide of the following general formula (1) or mixtures of oxides falling under formula (1):

$$M_{1-x}D_xO_2 \quad \text{formula (1).}$$

In formula (1), M is selected from Ti, Zr, Sn and combinations thereof, D is selected from V, Nb, Ta, P, As, Sb, Bi and combinations thereof, and x satisfies the following relation: 0<x<0.5.

Alternatively or in addition to the oxide(s) of the formula (1), first oxide 11 may also include at least one oxide of the following general formula (2):

$$Zn_{1-y}Q_yO \quad \text{formula (2).}$$

In formula (2), Q is selected from Al, Ga, In, B, Ti, Zr, Hf, Si, Ge, Sn and combinations thereof, and y satisfies the following relation: 0<y<0.5.

Alternatively or in addition to the oxide or the oxides of the formulas (1) and (2), first oxide 11 may also include an oxide, which is selected from the group made up of: $ZrO_{2-r}$, $TiO_{2-r}$, $SnO_{2-r}$, $ZnO_{1-r}$, $HfO_{2-r}$, $V_2O_{5-r}$, $Nb_2O_{5-r}$, and $Ta_2O_{5-r}$. r satisfies the relation 0.5>r≥0.

The aforementioned oxides may each be used individually or also, however, in arbitrary combinations. The total portion of first oxide 11 is, in particular, 60 mass percent to 85 mass percent with respect to the total mass of resistor element 8.

Resistor element 8 is free of inorganic, nonoxidic, electrically conductive materials, metals, and alloys.

In addition to first oxide 11, resistor element 8 also includes at least one second oxide 10, which is an inorganic, amorphous oxide. Second oxide 10 is present in the form of a glass and forms, in part, a matrix for crystalline first oxide 11. As a result, a very high stability of resistor element 8 is achieved. The glass is, in particular, a silicate glass, due to its high stability also at high temperatures.

The total content of second oxide 10 is, in particular, 5 mass percent to 30 mass percent with respect to the total mass of resistor element 8, so that a particularly stable oxidic matrix of resistor element 8 is obtained.

Optionally, resistor element 8 may contain at least one third oxide, which is selected from $ZrO_2$, $TiO_2$, $Al_2O_3$ and mixtures thereof.

Resistor element 8 is distinguished by a particularly high oxidation resistance, so that no degradation of the material of resistor element 8 takes place during the manufacture of a spark plug by utilizing resistor element 8. As a result, the desired resistance value may be kept permanently stable. Resistor element 8 therefore not only has a high chemical stability, but also a very good mechanical stability, also when used as intended.

First contact element 9a and second contact element 9b may be designed similarly to resistor element 8 with respect to the chemical composition, i.e., may also include a first oxide 11, optionally a second oxide 10 and, optionally, a third oxide, as defined above, and, in particular, may be free of metals and carbonaceous compounds. The compositions differ, however, in that first contact element 9a and second contact element 9b have a specific conductivity of $10^2$ S/m to $10^8$ S/m. This may be achieved with the aid of different dopings of the appropriate oxides or also with the aid of different contents of the oxides. First contact element 9a and second contact element 9b are also distinguished by a good oxidation resistance in combination with a simultaneously very high electrical conductivity.

What is claimed is:

1. A spark plug connecting element, comprising:
   a first contact element;
   a second contact element; and
   a resistor element situated between the first contact element and the second contact element;
   wherein the first contact element and the second contact element have a specific conductivity of $10^2$ S/m to $10^8$ S/m, and the resistor element have a specific conductivity of $10^{-3}$ S/m to $10'$ S/m.

2. The spark plug connecting element as recited in claim 1, wherein the first contact element and/or the second contact element and/or the resistor element is free of metals and carbonaceous compounds.

3. The spark plug connecting element as recited in claim 1, wherein the first contact element and/or the second contact element and/or the resistor element is free of inorganic, nonoxidic, electrically conductive material, metals, and alloys.

4. The spark plug connecting element as recited in claim 1, wherein the first contact element and/or the second contact element and/or the resistor element are made up of at least one first oxide and at least one additive, a total content of the additive with respect to a total mass of the first contact element and/or the second contact element and/or the resistor element being less than 5 mass percent.

5. The spark plug connecting element as recited in claim 1, wherein the first contact element and/or the second contact element and/or the resistor element are made up of at least one first oxide and at least one additive, a total content of the additive with respect to a total mass of the first contact element and/or the second contact element and/or the resistor element being less than 0.5 mass percent.

6. A spark plug connecting element, comprising:
a first contact element;
a second contact element; and
a resistor element situated between the first contact element and the second contact element;
wherein the first contact element and/or the second contact element and/or the resistor element containing at least one first oxide selected from a group made up of:
(i) oxides of the following formula:

$$M_{1-x}D_xO_2$$

M being selected from Ti, Zr, Sn and combinations of Ti, Zr, Sn, D being selected from V, Nb, Ta, P, As, Sb, Bi and combinations of V, Nb, Ta, P, As, Sb, Bi, and 0<x<0.5, and/or (ii) oxides of the following formula:

$$Zn_{1-y}Q_yO,$$

Q being selected from Al, Ga, In, B, Ti, Zr, Hf, Si, Ge, Sn and combinations of Al, Ga, In, B, Ti, Zr, Hf, Si, Ge, Sn, and 0<y<0.5, and/or (iii) oxides selected from the group made up of: $ZrO_{2-r}$, $TiO_{2-r}$, $SnO_{2-r}$, $ZnO_{1-r}$, $HfO_{2-r}$, $V_2O_{5-r}$, $Nb_2O_{5-r}$, and $Ta_2O_{5-r}$, where 0.5>r≥0.

7. The spark plug connecting element as recited in claim 6, wherein the first contact element and/or the second contact element and/or the resistor element is free of metals and carbonaceous compounds.

8. The spark plug connecting element as recited in claim 6, wherein the first contact element and/or the second contact element and/or the resistor element contains at least one second oxide, which is an inorganic, amorphous oxide.

9. The spark plug connecting element as recited in claim 8, wherein the second oxide is a silicate glass.

10. The spark plug connecting element as recited in claim 8, wherein the first contact element and/or the second contact element and/or the resistor element contains at least one third oxide, which is a crystalline oxide selected from $ZrO_2$, $TiO_2$, $Al_2O_3$ and mixtures of $ZrO_2$, $TiO_2$, $Al_2O_3$.

11. The spark plug connecting element as recited in claim 6, wherein a total content of the first oxide in the first contact element and/or in the second contact element and/or in the resistor element is maximally 100 mass percent, with respect to a total mass of the first contact element and/or the second contact element and/or the resistor element.

12. The spark plug connecting element as recited in claim 6, wherein a total content of the first oxide in the first contact element and/or in the second contact element and/or in the resistor element is 40 mass percent to 95 mass percent with respect to a total mass of the first contact element and/or the second contact element and/or the resistor element.

13. The spark plug connecting element as recited in claim 6, wherein a total content of the first oxide in the first contact element and/or in the second contact element and/or in the resistor element is 60 mass percent to 85 mass percent with respect to a total mass of the first contact element and/or the second contact element and/or the resistor element.

14. The spark plug connecting element as recited in claim 8, wherein a total content of the second oxide in the first contact element and/or in the second contact element and/or in the resistor element is more than 0 mass percent to 75 mass percent with respect to a total mass of the first contact element and/or the second contact element and/or the resistor element.

15. The spark plug connecting element as recited in claim 8, wherein a total content of the second oxide in the first contact element and/or in the second contact element and/or in the resistor element is more than 0 mass percent to 45 mass percent with respect to a total mass of the first contact element and/or the second contact element and/or the resistor element.

16. The spark plug connecting element as recited in claim 8, wherein a total content of the second oxide in the first contact element and/or in the second contact element and/or in the resistor element is more than 20 mass percent to 40 mass percent with respect to a total mass of the first contact element and/or the second contact element and/or the resistor element.

17. The spark plug connecting element as recited in claim 8, wherein a total content of the second oxide in the first contact element and/or in the second contact element and/or in the resistor element is more than 28 mass percent to 38 mass percent with respect to a total mass of the first contact element and/or the second contact element and/or the resistor element.

18. The spark plug connecting element as recited in claim 10, wherein a total content of the third oxide in the first contact element and/or in the second contact element and/or in the resistor element is more than 0 mass percent to 20 mass percent, with respect to a total mass of the first contact element and/or the second contact element and/or the resistor element.

19. The spark plug connecting element as recited in claim 10, wherein a total content of the third oxide in the first contact element and/or in the second contact element and/or in the resistor element is more than 2 mass percent to 10 mass percent, with respect to a total mass of the first contact element and/or the second contact element and/or the resistor element.

20. The spark plug connecting element as recited in claim 10, wherein a total content of the third oxide in the first contact element and/or in the second contact element and/or in the resistor element is more than 3 mass percent to 5 mass percent, with respect to a total mass of the first contact element and/or the second contact element and/or the resistor element.

21. A spark plug comprising a spark plug connecting element, the spark plug connecting element including:
a first contact element;
a second contact element; and
a resistor element situated between the first contact element and the second contact element;
wherein the first contact element and the second contact element have a specific conductivity of $10^2$ S/m to $10^8$ S/m, and the resistor element have a specific conductivity of $10^{-3}$ S/m to 10'S/m.

22. A spark plug comprising a spark plug connecting element, the spark plug connecting element including:
a first contact element;
a second contact element; and
a resistor element situated between the first contact element and the second contact element;
wherein the first contact element and/or the second contact element and/or the resistor element containing at least one first oxide selected from a group made up of:
(i) oxides of the following formula:

$$M_{1-x}D_xO_2$$

M being selected from Ti, Zr, Sn and combinations of Ti, Zr, Sn, D being selected from V, Nb, Ta, P, As, Sb, Bi and combinations of V, Nb, Ta, P, As, Sb, Bi, and 0<x<0.5, and/or (ii) oxides of the following formula:

$$Zn_{1-y}Q_yO,$$

Q being selected from Al, Ga, In, B, Ti, Zr, Hf, Si, Ge, Sn and combinations of Al, Ga, In, B, Ti, Zr, Hf, Si, Ge, Sn, and $0<y<0.5$, and/or (iii) oxides selected from the group made up of: $ZrO_{2-r}$, $TiO_{2-r}$, $SnO_{2-r}$, $ZnO_{1-r}$, $HfO_{2-r}$, $V_2O_{5-r}$, $Nb_2O_{5-r}$, and $Ta_2O_{5-r}$, where $0.5>r\geq 0$.

* * * * *